(12) United States Patent
Wilson

(10) Patent No.: US 7,918,513 B2
(45) Date of Patent: Apr. 5, 2011

(54) VEHICLE WHEEL

(75) Inventor: Mike Wilson, Wiltshire (GB)

(73) Assignee: Yoshiyuki Takoi, Ohtaku, Tokyo (JP)

( * ) Notice: Subject to any disclaimer, the term of this patent is extended or adjusted under 35 U.S.C. 154(b) by 0 days.

(21) Appl. No.: 11/908,793

(22) PCT Filed: Mar. 14, 2006

(86) PCT No.: PCT/IB2006/001318
§ 371 (c)(1),
(2), (4) Date: Nov. 9, 2007

(87) PCT Pub. No.: WO2006/097856
PCT Pub. Date: Sep. 21, 2006

(65) Prior Publication Data
US 2008/0143171 A1    Jun. 19, 2008

(30) Foreign Application Priority Data
Mar. 16, 2005   (DE) .................... 20 2005 004 399 U

(51) Int. Cl.
*B60B 23/08*    (2006.01)
*B60B 5/02*    (2006.01)

(52) U.S. Cl. ......... 301/64.702; 301/64.101; 301/64.704; 301/95.102

(58) Field of Classification Search ................. 301/10.1, 301/11.1, 12.1, 63.101, 63.102, 63.106, 64.101, 301/64.202, 64.701, 64.704, 64.705, 64.305, 301/65, 67, 69, 79, 95.101, 95.102, 95.11, 301/28
See application file for complete search history.

(56) References Cited

U.S. PATENT DOCUMENTS

| | | | | |
|---|---|---|---|---|
| 1,518,290 A * | 12/1924 | Worrall et al. | ............... | 301/64.6 |
| 1,721,725 A * | 7/1929 | Baker | ............ | 152/375 |
| 2,871,905 A * | 2/1959 | Stanton | ........... | 152/404 |
| 3,346,301 A * | 10/1967 | Hurst, Jr. et al. | ............... | 301/65 |
| 3,910,638 A * | 10/1975 | Scott | ........... | 301/63.104 |
| 4,017,348 A * | 4/1977 | Shumaker | ............ | 156/189 |
| 4,106,543 A * | 8/1978 | Sano | ........... | 152/405 |
| 4,146,274 A * | 3/1979 | Lejeune | ............... | 301/95.102 |
| 4,150,854 A * | 4/1979 | Lohmeyer | ............... | 301/58 |
| 4,153,267 A * | 5/1979 | Hilber | ........... | 280/281.1 |
| 4,180,293 A * | 12/1979 | Norris et al. | ............... | 301/54 |
| 4,294,639 A * | 10/1981 | Woelfel et al. | ............... | 156/185 |

(Continued)

FOREIGN PATENT DOCUMENTS
AU    524458    9/1982
(Continued)

*Primary Examiner* — Russell D Stormer
(74) *Attorney, Agent, or Firm* — Von Rohrscheidt Patents

(57) ABSTRACT

The invention concerns a vehicle wheel, in particular for passenger vehicles and motorcycles, comprising a rim for receiving a tire and a spoke unit or a wheel disc connecting the rim to the hub. The rim is made of plastic material and the spoke unit or the wheel disc of metal. The rim is connected to the spoke unit or wheel disc by form-closure and/or by force-closure of the material. The invention aims at enabling the wheel disc to be accurately positioned relative to the rim base and at providing a wheel with an attractive design. Therefore, the spoke unit, or the wheel disc are connected via at least one connecting element guided through the rim base and the connecting element is housed in the spoke unit or the wheel disc so as to be completely covered by a tire or by the spoke unit or the wheel disc.

5 Claims, 4 Drawing Sheets

U.S. PATENT DOCUMENTS

Figure 1:
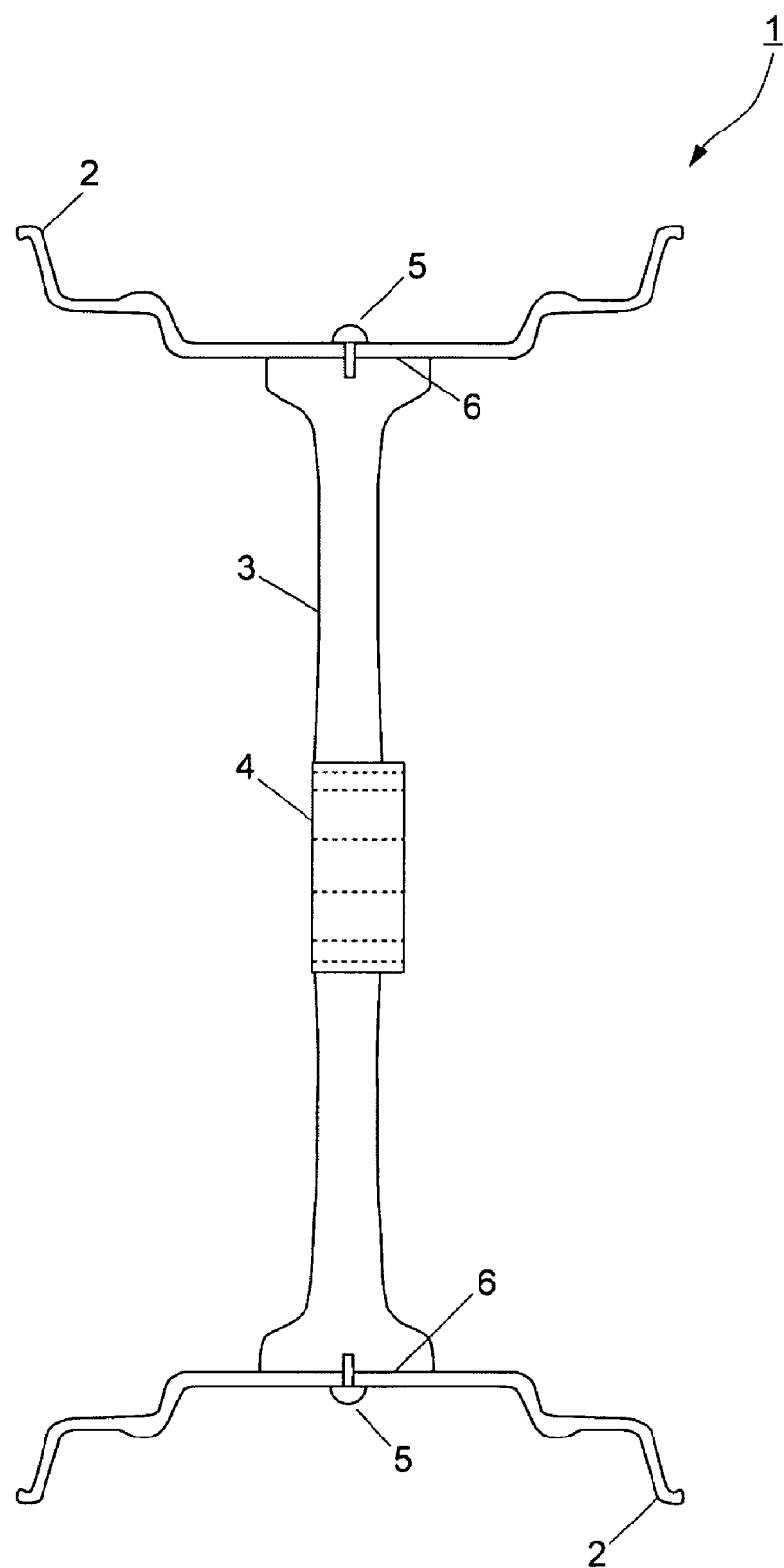

| | | | | |
|---|---|---|---|---|
| 4,518,204 A | * | 5/1985 | Takada | 301/63.103 |
| 4,523,790 A | * | 6/1985 | Mariani | 301/64.304 |
| 4,749,235 A | * | 6/1988 | McDougall | 301/64.703 |
| 4,982,998 A | | 1/1991 | Mikawa | |
| 5,282,673 A | * | 2/1994 | Koyama et al. | 301/64.307 |
| 5,613,739 A | * | 3/1997 | Sands | 301/95.11 |
| 5,997,102 A | * | 12/1999 | Stanavich | 301/63.103 |
| 6,820,668 B2 | * | 11/2004 | Passarotto | 152/427 |
| 7,309,110 B2 | * | 12/2007 | Vernet et al. | 301/95.102 |

FOREIGN PATENT DOCUMENTS

| | | | |
|---|---|---|---|
| DE | 3904009 A1 | * | 8/1990 |
| DE | 9014530 | | 2/1991 |
| FR | 2666544 | | 3/1992 |
| JP | 58093601 A | * | 6/1983 |
| JP | 60151102 A | * | 8/1985 |
| JP | 62071705 A | * | 4/1987 |
| JP | 2018102 | | 1/1990 |
| WO | WO 9301946 A1 | * | 2/1993 |

* cited by examiner

VEHICLE WHEEL

The invention concerns a vehicle wheel, in particular for passenger vehicles and motorcycles, comprising a rim for receiving a tire and a spoke unit or a wheel disc connecting the rim to the hub. The rim is made of plastic material and the spoke unit or the wheel disc of metal. The rim is connected to the spoke unit or wheel disc by form-closure and/or by force-closure of the material.

Depending on their intended use, wheels for vehicles have various configurations. The technical variations between the particular vehicle wheels are determined primarily through the configuration of the rim, which is to receive an air inflated tire without a tube, or with a tube. Since vehicle wheels influence the exterior appearance of motor vehicles substantially, users wish to have vehicle wheels with an individual design. In order to achieve a maximum design variety with few components, vehicle wheels are assembled from various components from a kit system. The rim can be assembled from single components, which allows a technical variety and breadth of variations, and the connection of wheel hub and rim is also provided differently in different wheels, whereby a breadth of variations is also provided in the outward appearance of the wheel.

A wheel composed of single components, however, gains weight with each single component, which is undesirable in wheels. Typically there is a desire to reduce the weight of the wheel and the tire as much possible, in order to keep the unsprung masses in a motor vehicle as low as possible.

Through the use of plastic material for the wheel rim, the vehicle wheel is reduced in weight considerably, compared to a solid metal version. A plastic version of the connection between wheel rim and wheel hub has not been used so far, since plastic materials with respective stability and temperature resistance are not available.

The state of the art, e.g. in DE 41 23 459 C1, therefore proposes to manufacture rims from plastic material, and to mount a wheel dish to the plastic rim, wherein the wheel dish is made from metal. The connection of single wheel components, in particular the connection between wheel rim and wheel hub, however, is not without problems. The connection between wheel hub and wheel rim has to transfer high torque, in particular during braking action, at the same time, the connection has to be provided, so that the air tightness for tubeless tires is not compromised.

In DE 41 23 459 C1 it is therefore proposed to mount a metal wheel dish onto a collar of the rim, which faces towards the wheel hub. The collar described in this patent document is located on the inside of the wheel, facing the wheel hub, under the deep base of the rim. Bolts are inserted into this collar through bore holes from the side of the wheel facing towards the vehicle, reaching into respective inner threads of the wheel dish with their threads. The wheel dish to be inserted thereby covers this collar and rests on the rim between hump and deep base of the rim. The collar described in DE 41 23 459 C1 for mounting the wheel hub has considerable problems, when manufacturing the plastic rim. This collar complicates the manufacture, e.g. during casting, considerably, since the one piece rim cannot be removed from the mold any more. Typically, a shape with several pieces is used in order to solve this problem.

Another problem, when manufacturing such rims, comes with the use of composite materials as a plastic rim. E.g., when manufacturing it from fiber composite material, said rim has the problem that the fiber composite material within the mold cannot be positioned precisely enough, in order to provide continuous fiber reinforcement, in particular for this very highly stressed component of the rim.

Another problem of this vehicle type is that through the used mounting collar the vehicle wheel has an aesthetic side and a less aesthetic side, which faces the vehicle. Therefore, such a vehicle wheel is only suitable for cars. For the use of a vehicle wheel for motorcycles, it is important that the vehicle wheel has an aesthetic side on both sides of the vehicle plane, which is not encumbered by mounting bolts.

In U.S. Pat. No. 4,982,998 a layout for compound wheels is suggested, in which mounting bolts are run through the shoulder of a rim, which penetrate the wheel dish, and which are secured with a threaded nut on the side facing the vehicle. Though this embodiment works without the assembly collar, which is difficult to produce, however, it is also only suitable for cars and not suitable for motorcycles.

Therefore, it is the object of the invention to provide a vehicle wheel, which is made from different materials, preferably fiber reinforced plastic for the rim, and from metal for the wheel dish, or the spoke unit, wherein the problems of the state of the art are not present.

The objects according to the invention are accomplished through holding the spoke unit or the wheel nut through at least one connection element, which is held by the base of the rim, connected to the rim, and that the connection element is received in the spoke unit or the wheel dish, so that the connection element is completely covered by a tire on the one hand, and by the spoke unit or the wheel dish, on the other hand. Further preferred embodiments of the invention can be derived from the dependent claims.

Through the connection of the spoke unit, or the wheel dish with the rim through at least one connection element, which is guided by the rim base, comes the advantage that a collar, like it is taught e.g. in DE 41 23 459 C1, can be left away, whereby the problems in the manufacture of a highly stress resistant inner rim collar can be avoided. Through running at least one connector element through the base of the rim, a wheel dish or a spoke unit can be fitted into the inside of the rim in a form locking manner, wherein the inside of the rim means the side of the rim facing the wheel hub and the at least one connection element connects the wheel dish or the spoke unit with the rim through the rim. The use of plastic materials thus allows a reliable seal of the base of the rim, which was not possible so far when using state of the art metal rims. Compared to a metal rim, a plastic rim can employ materials, which connect with the plastic, and can thus at least on the side facing the plastic provide a high level of leak tightness. In case this is a plastic material, which can be deformed and which is used as a sealing compound, it is also possible to reliably seal the side facing the connection element, e.g. a bolt or a rivet, so that the rim can also be used as a base for a tubeless tire.

Furthermore, the connection between wheel dish or spoke element with the rim through the rim base has the advantage that unilateral tensions, which stress the rim highly, can be avoided through the use of a mounting collar on the side facing the wheel hub, since the wheel dish or the spoke element is supported in the interior of the rim.

In a preferred manner, the rim is made from carbon reinforced plastic; in a particularly preferred embodiment, the rim is made from carbon reinforced epoxy resin. Through the use of carbon fiber reinforced epoxy resin, it is accomplished that, on the one hand, the weight of the entire vehicle wheel is significantly reduced, compared to a metal wheel, and thus the unsprung mass of a vehicle is also significantly reduced. Furthermore, the use of epoxy resin allows the use of seals, which connect with the surface of the epoxy resin, since epoxy resin can be glued, so that a high level of tightness of the pass-through of the at least one connection element can be accomplished. Furthermore, it is advantageous that carbon fiber reinforced epoxy resin has a higher stability than e.g. steel at the same weight.

When using fiber woven materials and layups for reinforcing the epoxy resin, different fiber layups can be used. On the one hand it is possible to wrap the fibers in tangential direction around the rim, so that a particularly high torque resistance of the rim is accomplished. Furthermore, it is also possible to use fiber woven materials and layups as a fiber component in the epoxy resin, which are manufactured through the typical weaving process, so that e.g. a diagonal layer of fibers, a perpendicular, or a parallel layout, or a joint array of various directions of fibers with reference to the tangential plane of the base of the rim is present. Depending on the selection of the orientation of the fibers, the rim has different strength properties in different directions. A person skilled in the art can select the direction of the fibers in the epoxy resin, depending on the desired strength profile, and can also select combinations of different fiber directions as fiber reinforcement.

In a further advantageous embodiment of the invention, a valve hole leads from the side of the mouth of the rim to the side facing the wheel hub. Through the use of a wheel hole, which leads from the side of the mouth of the rim to the side facing the wheel hub, it is possible to place the valve hole also at a hidden location within the wheel, so that the valve does not degrade the optical impression of the wheel.

In a special embodiment of the invention, a valve hole is provided for receiving a connection between the rim and the spoke unit or the wheel dish, wherein the connection is provided hollow for passing tire gas through. Through the use of a valve hole for receiving the connection between rim and spoke unit, or wheel dish, it is accomplished that the valve hole extends within a spoke unit, or within the wheel dish, so that an additional bore hole through the base of the rim can be dispensed with, which increases the stability of the base of the rim, and which also provides the opportunity to hide the air valve from the view.

In an advantageous manner, the at least one connection element, which is run through the base of the rim, is provided with at least one seal on the side of the mouth of the rim, wherein the seal is made from paper, rubber, silicon, polyurethane, or from another elastomer. Besides the use of seals for sealing the rim, it is also possible, e.g. through the use compression bolts, or of bolts with a particularly shaped head, to provide leak tightness, wherein the connection element is connected with the rim tight enough, so that a tight connection assembly is provided. When using sealing compounds, an excessively strong bolting, or riveting can be dispensed with, without jeopardizing the leak tightness of the rim. In particular, when using elastomers as seal elements, it is advantageous that elastomers can be used as sealing compound in a non bonded state, wherein the elastomer bonds during the connection, and chemically connects with the surface of the rim, wherein a higher degree of leak tightness is accomplished.

Thus further materials can be used in order to establish an improved sealing between the sealing compound and the connection element itself. It is also possible to join or glue the component of the connection element, reaching into the rim, through the sealing compound itself. Through the joining or gluing, it is accomplished that the connection element is completely embedded in the sealing compound, so that a seal without gaps or capillaries is formed around the at least one connection element.

In the embodiment of the invention, it is provided that preferably several connection elements in the form threaded bolts are distributed along the circumference of the base of the rim, and are bolted into threaded bores of the spoke unit or wheel dish.

In a preferred embodiment of the invention, the spoke element or the wheel dish rests in a form locking manner on the side of the rim, facing towards the hub of the wheel, wherein the form locked surface of the spoke element or the wheel dish is at least 1 cm$^2$ or more. For wheels with a lower number of spokes, wherein low means 3 to 9, but also numbers in the general range of these numbers, it is advantageous, when the support surface of each single spoke at the side of the base of the rim facing the wheel hub is sized, so that the load of the vehicle is evenly distributed onto the rim surface, and point loads are avoided. Hereby, an even higher stability and an even higher torque resistance of the hub-rim connection are accomplished. Each spoke is thereby connected with the base of the rim through at least one connection element.

The vehicle wheel according to the invention can be provided as a steep shoulder rim, or as a broad shoulder rim, wherein in case of the steep shoulder rim, the storage element, or the wheel dish rests on the shoulder of the rim, in case of a wide rim, the spoke element, or the wheel dish rests on the side of the wheel hub facing the base of the rim. Hereby, also all other rim designs are viable, wherein the spoke element, or the wheel dish are disposed on a surface of the rim, which offer enough space for a respective receiving surface.

The rim can thereby also be radially divided in the wheel plane. In a radially divided rim, there is the advantage that various rim widths can be put together through a kit system, wherein in case of a spoke element, the spokes can either rest on a part of the rim, or on both parts of the rim. It is also possible to use the spoke element as connection element for the radially divided rim components, wherein one respective connection element is run through the rim components and reaches into the spoke element, whereby the radially divided rim is held together. It is also possible that the rim is radially divided, wherein in this case the rims are also held together through the spoke element or through the wheel dish.

The invention is subsequently explained in more detail with reference to the figures.

Figure 2:
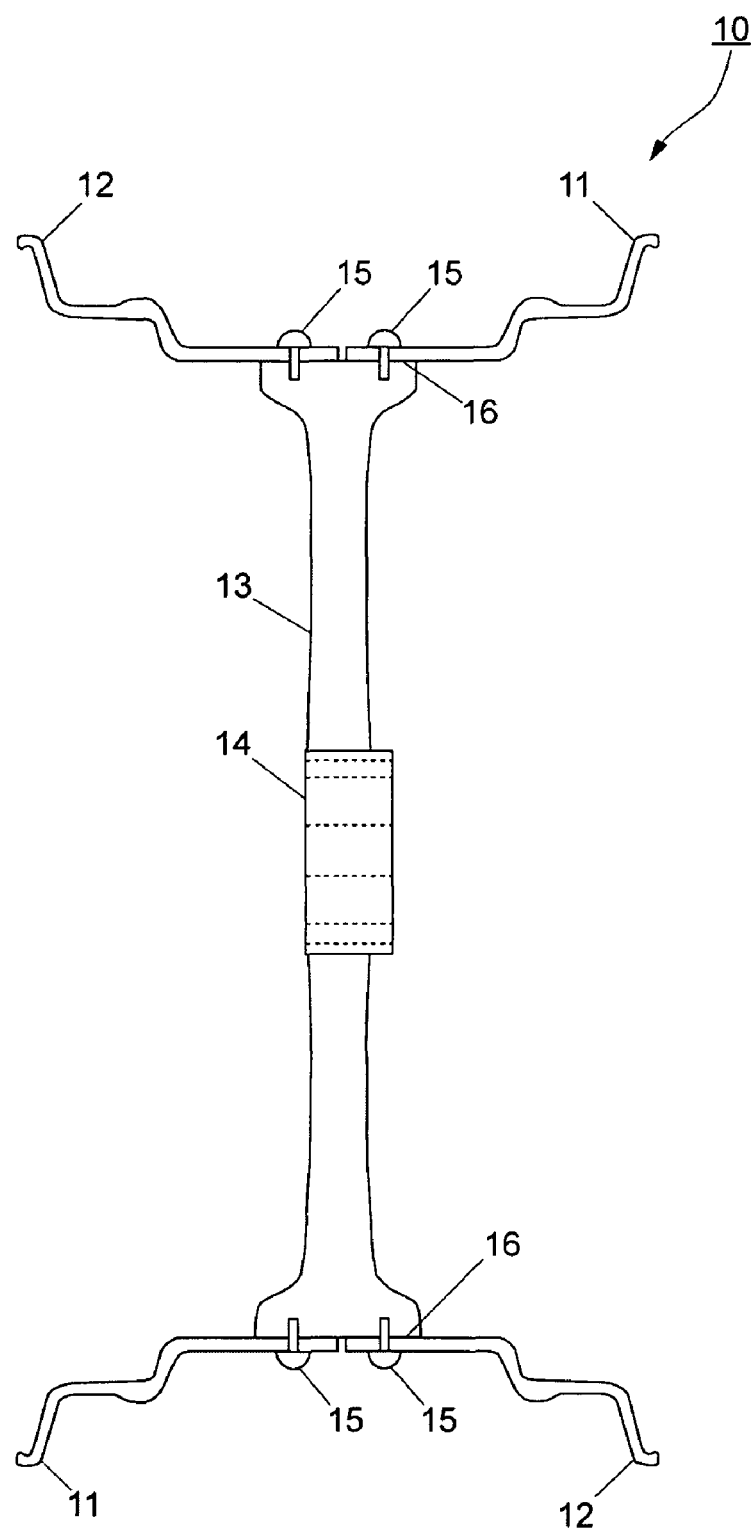
Figure 3:
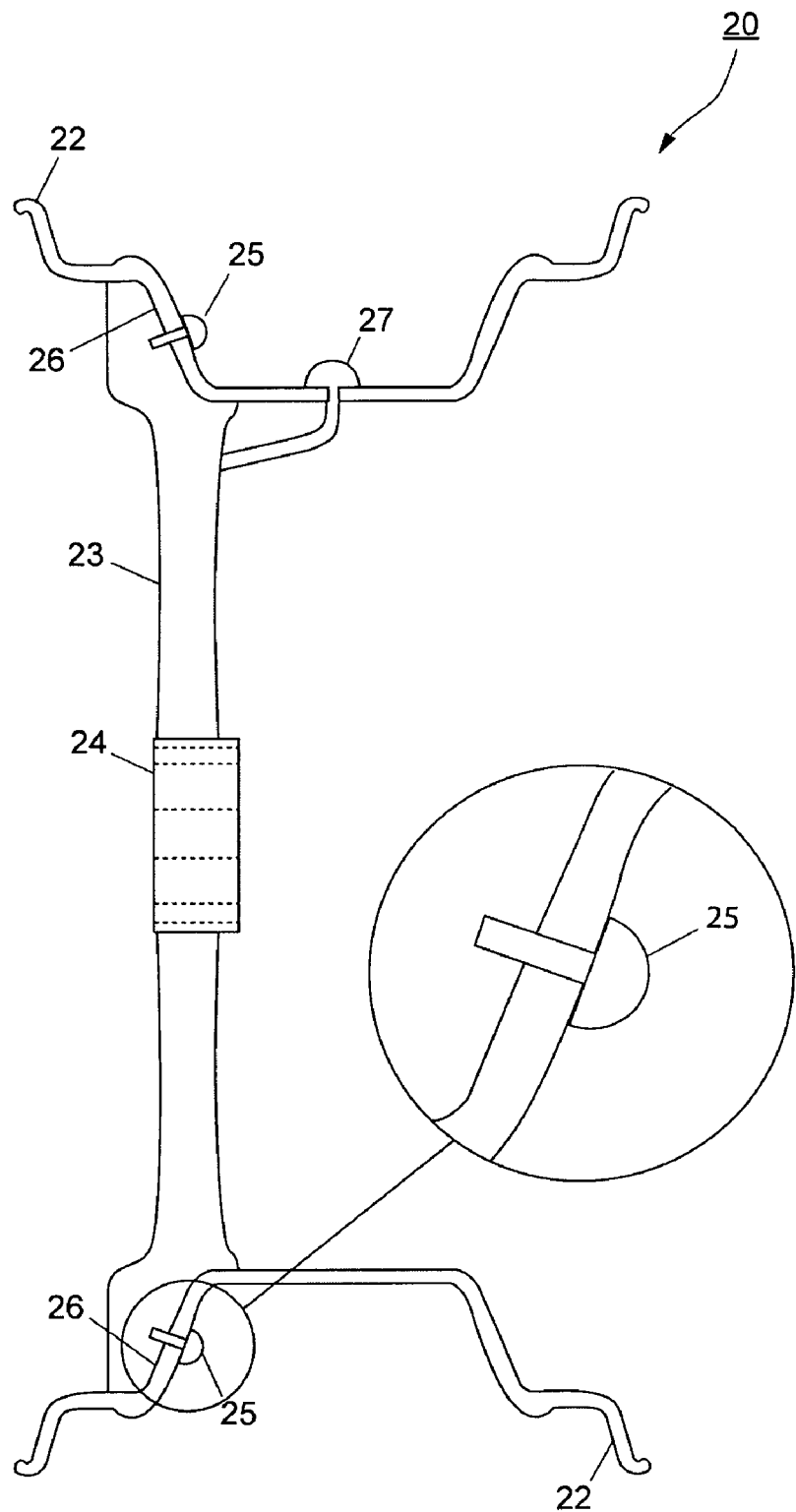
Figure 4:
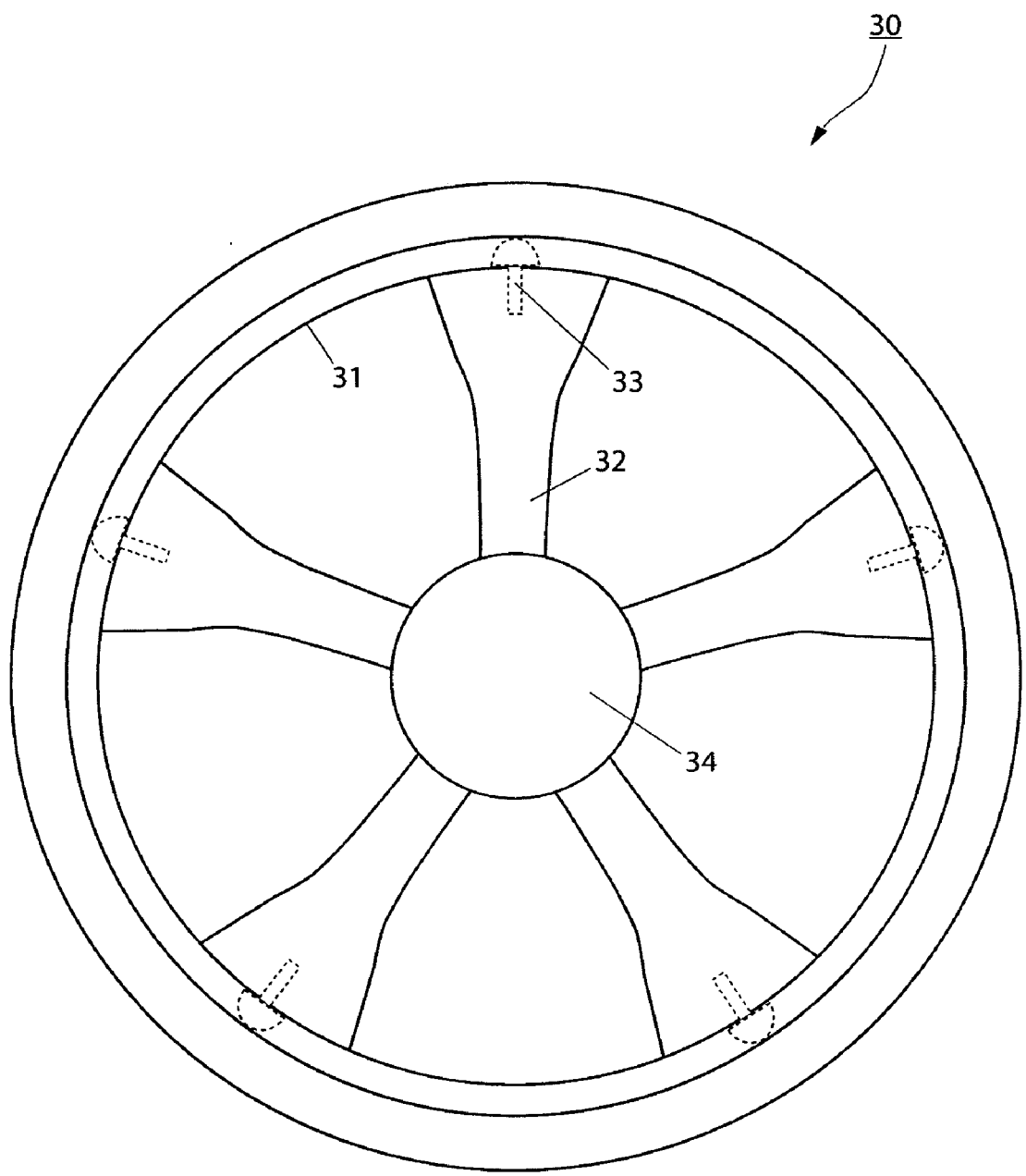

It is shown in:

FIG. 1 a vertical cross section through a vehicle wheel according to the invention, perpendicular to the plane of the wheel, with a spoke unit;

FIG. 2 a vertical section through a wheel according to the invention with a radially divided rim;

FIG. 3 a wheel according to the invention, with a cut perpendicular to the wheel plane with a wheel dish; and FIG. 4 a vehicle wheel in a spoke version in a front view.

In FIG. 1 a vehicle wheel 1 according to the invention is illustrated, which is composed of a rim 2 and a spoke unit 3. In the middle of the spoke unit 3 the wheel hub 4 is received, onto which the vehicle axle and the brake disc of a vehicle are mounted. The spoke unit 3 is connected with the rim 2 through connection elements 5, wherein the spoke unit 3 has a comparatively large support surface 6 on the side of the vehicle base, facing the wheel hub. The connection elements 5 are run from the side of the rim mouth through the rim 2, and they are received by the spoke unit 3, so that the connection elements 5 are shielded from the environment through a tire of the vehicle wheel, on the one hand, and through the spoke element, on the other hand, when the vehicle wheel 1 is used as intended.

In FIG. 2, a vehicle wheel 10 according to the invention is shown, which is composed of two radially divided rim components 11, 12, which are connected through a central spoke unit 13. The spoke unit 13, connecting the two rim components 11, 12, has a wheel hub 14 in the center for connecting with the brake disc and the vehicle axle of a vehicle. The two rim components 11, 12 are connected through at least two connection elements 5 from the side of the rim, facing the mouth of the rim through the rim components 11, 12, each connected with a respective connection element 15, wherein the central spoke element 13 holds the two radially divided rim components 11, 12 together. Thus the central spoke unit 13 is located on the side of the base of the rim, facing the wheel hub, wherein the base of the rim is formed by the rim components 11, 12, and thus transfers the load of the vehicle to the rim from the rim components 11, 12.

FIG. 3 shows a vehicle wheel 20 according to the invention, which consists of a steep shoulder rim 22 and a central wheel dish 23. The central wheel dish 23 has a wheel hub 24, through which the vehicle wheel 20 according to the invention is connected with the brake disc and the vehicle axle of a vehicle. The vehicle dish 23 is connected through connection elements 25 through the steep shoulder rim 22, wherein the connection elements 25 are completely received in the wheel dish 23. When the vehicle wheel 20 according to the invention is used as intended, thus the connection elements 25 are completely shielded from the outer environment through a vehicle tire, on the one hand, and through the wheel dish, on the other hand. FIG. 3 additionally shows a valve 27, which is run through the valve base of the steep shoulder rim 22.

In FIG. 4, a vehicle wheel 30 according to the invention is shown, which is composed of a rim 31 and five spokes 32. The particular spokes 32 are only connected by material closure amongst each other at the wheel hub 34, and have no connection at their circumference, besides through the rim 31. The particular spokes 32 serve for receiving a connection element 33, which is run through the base of the rim, and thus connects the rim 31 with the particular spokes 32. Through the arrangement of the connection elements 33 according to the invention, which are run through the rim 31 and which are received in a spoke 32, the connection elements 33 are hidden optically, so that no connection element is recognizable on the outside.

In the FIGS. 1 through 3, different designs of the invention are shown, wherein the figures do not describe the invention in a final manner. The embodiments are exemplary for a multitude of different shapes of rims and for a different design of the wheel dishes or the spoke units.

Designations
1 vehicle wheel
2 rim
3 spoke unit
4 wheel hub
5 connection element
6 support surface
10 vehicle wheel
11 rim component
12 rim component
13 spoke unit
14 wheel hub
20 vehicle wheel
22 steep shoulder rim
23 wheel dish
24 wheel hub
25 connection element
27 valve
30 vehicle wheel
31 rim
32 spoke
33 connection element
34 wheel hub

What is claimed is:

1. A vehicle wheel comprising:
a one piece rim for receiving a tire,
a wheel hub, and
a support element connecting the rim with the wheel hub,
wherein the support element is made of metal,
wherein the support element is connected with the rim through at least one connection element which extends through a base of the rim, and the connection element is received in the support element, so that the connection element is completely covered by the tire on one side, and by the support element on the other side,
wherein the one piece rim is made from carbon fiber woven materials or layups with one of either fibers or a fiber compound wound around a rotation axis of the rim such that the carbon fiber woven materials or layups reinforce an epoxy resin, and
wherein the at least one connection element is screwed into a threaded hole in the support element and is provided with at least one seal member formed with a sealing compound and the epoxy resin on a side of a mouth of the one piece rim, wherein the sealing compound is an elastomer that chemically connects to the rim.

2. A vehicle according to claim 1, wherein a valve hole is provided for receiving a connection element between the one piece rim and the support element, wherein the connection element is hollow for passing tire gas through.

3. A vehicle according to claim 1, wherein the at least one connection element comprises several connection elements in the form of threaded bolts that are distributed around a circumference of the base of the one piece rim, and threaded into threaded bore holes of the support element.

4. A vehicle according to claim 1, wherein the support element is a spoke unit, wherein particular spokes are connected amongst each other through material bonding in the section of the wheel hub.

5. A vehicle according to claim 1, wherein the support element comprises at least one of either a spoke unit or a wheel dish.

* * * * *